Figure 1:
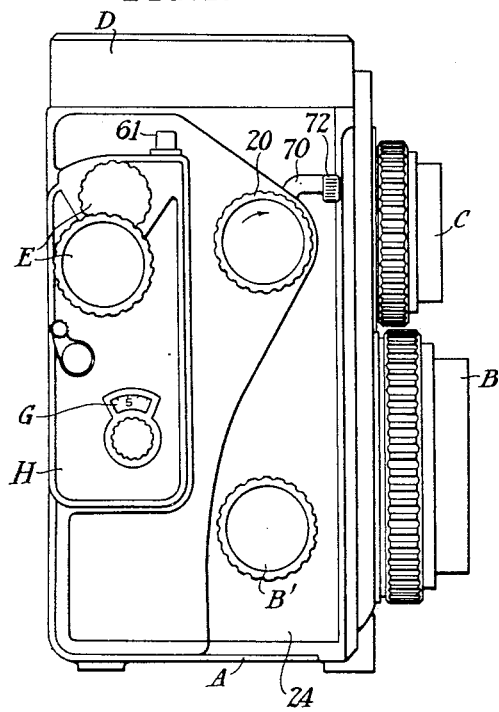

Jan. 12, 1943.     H. D. PHILIPS     2,307,748
DOUBLE EXPOSURE PREVENTION DEVICE
Filed Jan. 23, 1941     2 Sheets-Sheet 1

HARLOW D. PHILIPS
INVENTOR

BY
ATTORNEYS

Jan. 12, 1943. H. D. PHILIPS 2,307,748
DOUBLE EXPOSURE PREVENTION DEVICE
Filed Jan. 23, 1941 2 Sheets-Sheet 2
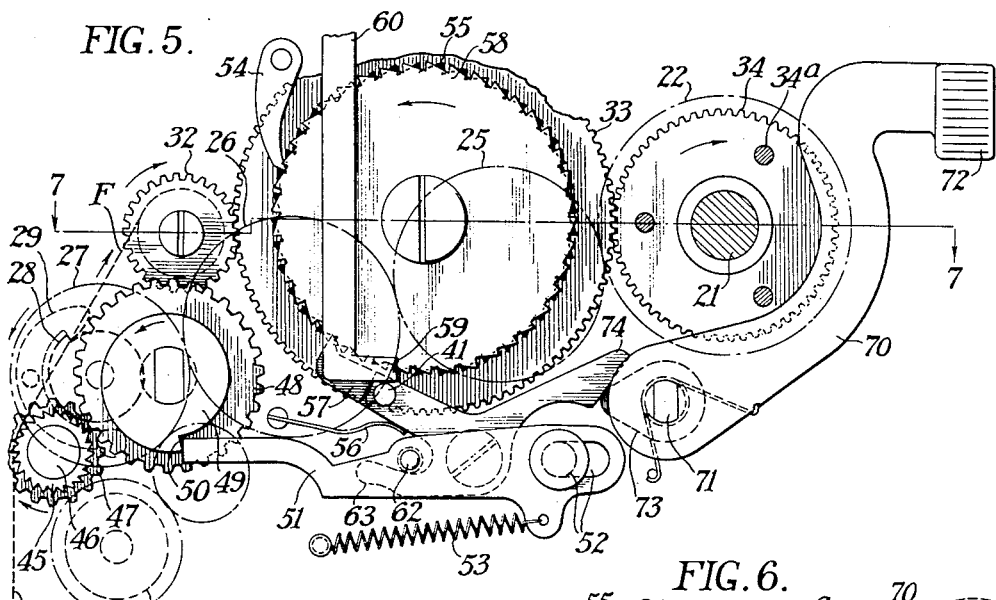
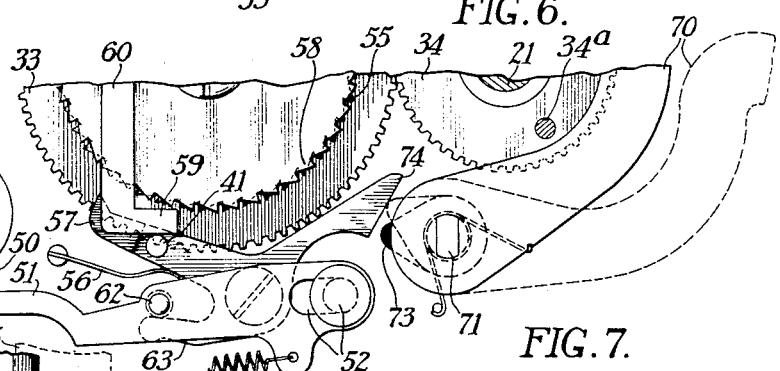
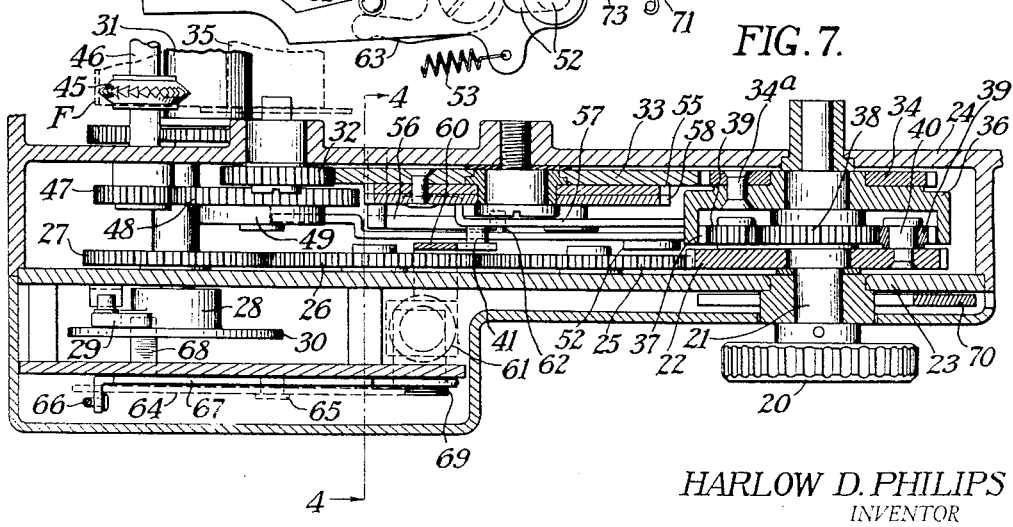
HARLOW D. PHILIPS
INVENTOR
BY
ATTORNEYS Patented Jan. 12, 1943

2,307,748

UNITED STATES PATENT OFFICE 2,307,748

DOUBLE EXPOSURE PREVENTION DEVICE

Harlow D. Philips, Rochester, N. Y., assignor to Eastman Kodak Company, Rochester, N. Y., a corporation of New Jersey Application January 23, 1941, Serial No. 375,649

8 Claims. (Cl. 95—31)

This invention relates to photography and more particularly to photographic cameras. One object of my invention is to provide a camera in which the film winding and shutter winding mechanism is interconnected so that double exposures are prevented. Another object is to provide an interlocking device which in itself is simple and definite in its operation. Another object of my invention is to provide a structure normally connecting the shutter and film winding mechanism but which can be thrown out of its operative position for rewinding film. Still another object is to provide a camera with relatively simple control members and other objects will appear from the following application the novel features being particularly pointed out in the claims at the end thereof.

Figure 2:
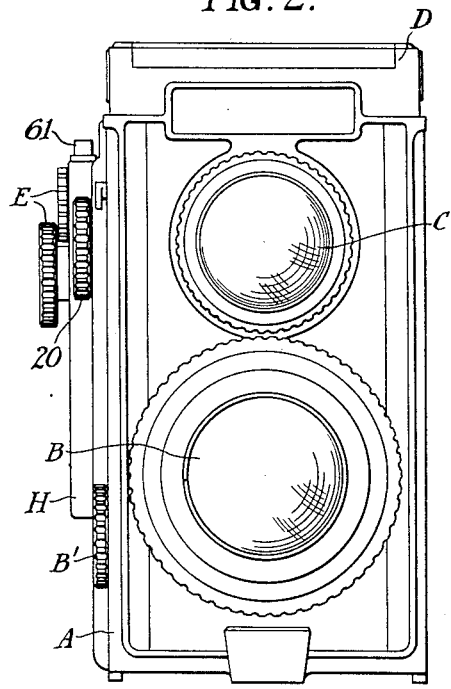
Figure 3:
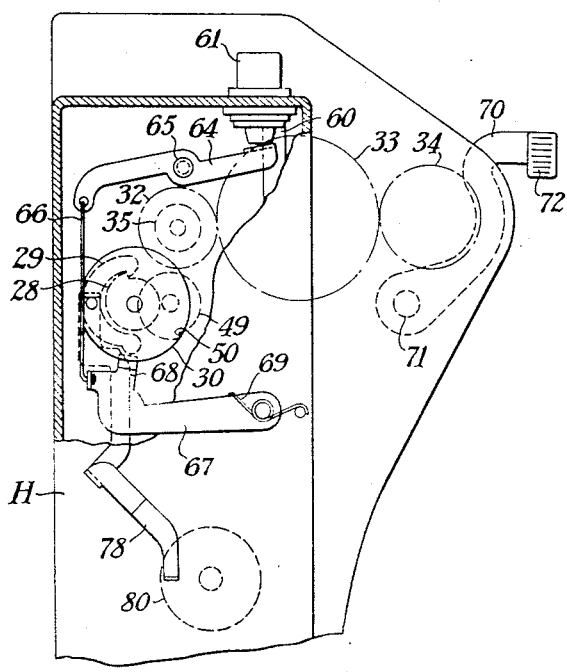
Figure 4:
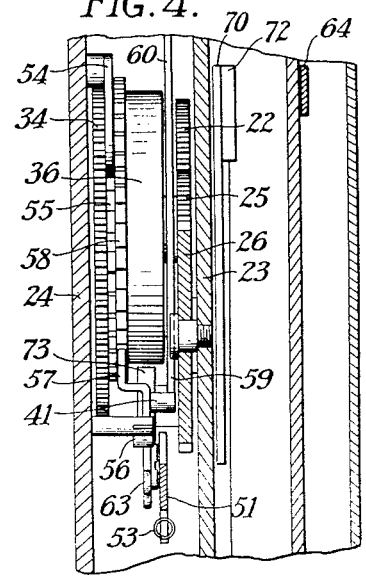

Coming now to the drawings wherein like reference characters denote like parts throughout:

Fig. 1 is a side elevation of a typical camera including a control mechanism construction in accordance with and embodying a preferred form of my invention, Fig. 2 is a front elevation of the camera shown in Fig. 1, Fig. 3 is an enlarged sectional detail, partly in elevation, of the shutter release mechanism, Fig. 4 is an enlarged fragmentary section on line 4—4 of Fig. 7, Fig. 5 is an enlarged plan view of the film winding and shutter setting mechanism, Fig. 6 is a view similar to Fig. 5 but with certain parts omitted and parts in a different (a released) position, and Fig. 7 is a section on line 7—7 of Fig. 5.

Broadly my invention comprises a camera in which a shutter is set and film is wound by turning a single knob. The shutter exposure time can of course be controlled by separate parts, and the film winding and shutter controlling mechanism may be manually disconnected for winding the film leader strip or tail strip and for preventing the measuring mechanism from functioning during this part of the operation of the camera.

In the embodiment of my invention illustrated the camera is shown in the drawings as being of the "reflex" type, having a body A, exposure lens B with focusing adjustment knob B', a finder lens C and finder housing D. It is obvious that my invention is equally applicable to other types of cameras, this type being selected as a preferred embodiment of my invention. This type of camera is usually equipped with a curtain shutter, which in the present instance is not shown in detail but it may be similar to the shutter shown in the U. S. application 299,864, Focal Plane shutter, in the name of Joseph Mihalyi, filed October 17, 1939 and which has become U. S. Patent No. 2,253,084, dated August 19, 1941. Suitable speed controls E for the shutter are arranged on the exterior of an auxiliary housing H within which most of the shutter operating and release members are located. These are not shown in the drawings since they form no part of my present invention. An exposure counter dial is visible at G to apprise the operator of the number of film frames exposed.

The invention provides an interlock between the curtain shutter and the film winding-on mechanism, whereby when the curtain is wound and set for an exposure no more film may be wound until the shutter is released and an exposure made. Conversely, the shutter cannot again be set for another exposure until a new frame of film has been carried to the exposure aperture. This interaction, viz., winding the film and shutter is accomplished by manipulating only one knob, indicated at 20 in the drawings, this knob serving to revolve the "sun" gear of a planetary system. Through the sun gear one train of gears is actuated to wind the shutter, and through the planetary gears another train advances the film. A stop-and-measuring device controls the film traverse and the overrun of the planetary gears in a manner to be more fully described hereinafter.

On the shaft 21 of winding knob 20 is a freely revoluble gear 22 which meshes with a train of gears on the inner side of a partition 23, spaced from the side wall 24 of the camera. These gears, 25, 26, 27, (Fig. 7) constitute connecting means between the knob 20 and a one-tooth ratchet 28 (Fig. 5), the latter being arranged to engage a pawl 29 on a disc 30 and through suitable connections, to wind a curtain shutter designated as 31 in this figure.

On the outer face of the camera wall 24 are other gears 32, 33, 34 (Fig. 7), through which the film may be wound on the usual spool 35. The gear 34 is riveted at 34a to a housing 36 which is free to revolve on the shaft 21, and having an internal ring of gear teeth 37. Fixed to the shaft 21 is a "sun" gear 38, meshing with planetary pinions 39 that are revoluble on pivots 40 in the gear 22.

By reason of the planetary gearing just described, a compensating device is provided which permits a differential relation between the film winding and the curtain shutter winding mechanisms, so that if the shutter is wound up to its limit stop before the film has been advanced the required amount, the gear 22 will be stopped and continued turning of the knob 20 will revolve the sun gear 38, and the pinions 39 will drive the gears 37 and 34, and through the gears 33 and 32 will advance the film until a stop mechanism, (later to be described) can act. If the film advance is completed first, the gears 34 and 37 will be stopped and the planetary assembly will then permit the sun gears 38 to continue turning, and the pinion 39 will turn gear 22, and then gears 25, 26, 27 until the shutter has been wound and brought to rest by its stop.

The complete mechanism and limit stops which are embodied in a curtain shutter as above mentioned are fully set forth in U. S. patent to Joseph Mihalyi, mentioned above and is therefore not shown or described in detail in this application.

For the purpose of establishing the required film traverse to the film windup spool 35, and simultaneously to prevent double exposures, mechanism is provided as shown in Figs. 5, 6, and 7. The film F passes over a toothed disc or measuring wheel 45 fixed on a shaft 46, so that the teeth of the disc by engaging the emulsion-coated side of the film will be positively driven as the film passes to the spool 35. A pinion 47 also fixed to the shaft 46 meshes with a gear 48 and the latter is substantially integral with a cam 49, having a single abutment 50. If now the knob 20 is turned, the gear train 34, 33 and 32 causes film to be wound onto spool 35, and the film moves the predetermined distance equal to one exposure frame (plus a separating margin). The parts are so proportioned that the measuring wheel 45 will turn gear 47 such a number of revolutions that the gear 48 and cam 49 will make exactly one full revolution in the direction indicated in Fig. 5.

As the shoulder 50 nears the end of this one revolution it engages the end of a detent 51, mounted by a slot-and-pin connection 52 on the camera wall 24, and forces the detent to the right against the tension of a spring 53, to the position of Fig. 5. The film spool 35 is prevented from winding or rotating in a counterclockwise direction by a pawl 54, constantly in engagement with a ratchet 55 fixed to the gear 33.

I find a distinct advantage in making the spring 53 of substantial strength, not only to insure the operation of detent 51 but to cushion what would otherwise be the sudden stopping of the mechanism when the winding movement is completed. Thus as the detent 51 moves to the right from the position shown in Fig. 6 to that shown in Fig. 5, spring 53 exerts increasing pressure on the detent avoiding a sudden shock in coming to rest. Moreover, when the detent is swung about stud 52 (as later described) it will rapidly snap back to its film winding position of Fig. 6.

When the parts have achieved this position, a spring 56 forces a second pawl 57 into engagement with a ratchet 58, the teeth of which face in a direction opposite to the teeth of ratchet 55. When this occurs the film cannot be advanced further, nor can it be retracted.

The pawl 57 carries a pin 41, and aligned therewith is a lug 59 on the lower end of a slidable bar 60. The latter is arranged to be depressed by the exposure control member or release button 61 (Figs. 1 and 3). When so depressed, the lug 59 strikes pin 41, swings pawl 57 downwardly, and the lower edge of the pawl strikes a pin 62 in the detent 51. The detent is thus moved downwardly, until its left end slips off the shoulder 50, at which point the spring 53 moves the detent bodily toward the left, as far as the slot and pin 52 will permit. An arm 63 which is part of pawl 57 engages pin 62 and prevents the pawl from engaging ratchet 58 until cam 49 has completed another revolution. The cam 49 is thus no longer prevented from turning as indicated (in Fig. 5 counterclockwise) and ratchet 58 is likewise free, so that the film may again be wound by turning the knob 20.

Simultaneously with the disengaging of detent 51 from shoulder 50 the curtain shutter is also released to make an exposure. The sliding bar 60 as before described is actuated downwardly by the release button 61 and may be returned by a spring, not shown. The button 61 also contacts a lever 64 (Fig. 3) pivoted at 65. The end of lever 64 opposite the button 61 carries a link 66 which connects it with a lever 67. A lug 68 on lever 67 is arranged to strike the tail of pawl 29 when the button 61 is depressed, thereby releasing the curtain shutter. A spring 69 returns the levers 67 and 64 and the button 61 to normal position. The gears 27, 26, 25 and 22 can revolve only in the indicated directions because a ratchet, not shown, is provided in a suitable location, as for instance, in the hub of gear 23. Likewise the shutter winding ratchet 28, as shown in the aforementioned application may only turn in one direction.

To provide for winding the film backing paper or leader strip onto the spool 35, whereby a length of paper greatly in excess of one picture area must traverse the measuring wheel 45, means must be provided for rendering the measuring and film winding stop mechanism inoperative for the duration of such prewinding, or until the check-number of the first exposure area becomes visible to the operator. To this end a lever 70 is pivoted at 71 and has a thumb-piece 72 whereby it may be depressed, thereby turning a cam 73 into contact with a tail end 74 of the pawl 57. When lever 70 is so moved and is held depressed, as shown in broken lines in Fig. 6, the pawl 57 is prevented from being forced into engagement with ratchet 58 by its spring 56, and the film may be wound onto spool 35 as required. The shutter 31 will not be wound and set at this time, because the gear 34 has not met with enough resistance to transfer the turning effort transmitted through knob 20 to gear 37 into a sufficiently powerful force to wind the shutter.

When thumb-piece 72 is released, spring 56 forces pawl 57 toward ratchet 58, but the pawl cannot meet the ratchet teeth because arm 63 strikes pin 62 which is set in detent 51. As the left end of this detent rides on the periphery of cam 49 (Fig. 6) until the cam has completed a revolution and the shoulder 50 forces the detent to the position of Fig. 5, the gears 32, 33 and 34 will be free to turn. As soon as the detent is so moved, it will rise sufficiently to allow the pawl 57 to engage ratchet 58, whereupon the film transport mechanism cannot be moved in either direction until button 61 is again depressed to release the shutter. The cam 49 constitutes a film measuring roll as at each revolution thereof a fresh area of film is wound into place. Thereafter the entire cycle may be repeated.

After the last exposure the follower end or trailer of the film or paper may be wound onto spool 35 whenever lever 70 is again held down.

I claim:

1. In a camera for roll film including backing paper and having a shutter of the type requiring setting before making an exposure, the combination with a film winding mechanism, a shutter setting mechanism, of a single manually operable member connected to both the film wind and shutter setting mechanisms, said film winding mechanism including a film measuring roll, a single-tooth ratchet and a multi-tooth ratchet both connected with the film measuring roll, a detent adapted to block the single tooth ratchet, a pawl pivoted on the detent and arranged to engage the multi-tooth ratchet, a slidable member adapted to simultaneously release the shutter, the detent, and the pawl, and means for preventing re-engagement of the detent and the pawl with their respective ratchets until an unexposed portion of the film strip has been wound across the measuring roll.

2. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll, a single tooth ratchet connected with the film measuring roll and adapted to make one revolution when an exposure area of said film is wound by said winding mechanism, a detent arranged to block said ratchet at the end of each revolution, a multi-tooth ratchet also connected with said roll, a pawl for blocking the multi-tooth ratchet, a slidable member adapted to simultaneously release the shutter, the detent, and the pawl, and means to prevent the blocking of both of said ratchets until an exposure area has been moved across said measuring roll.

3. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll, a single-tooth ratchet adapted to make one revolution as a predetermined length of film passes over said measuring roll, a detent arranged to engage said single-tooth ratchet, a pawl carried by the detent, a multi-tooth ratchet adapted to be engaged by the pawl to lock said winding mechanism, means for simultaneously releasing the shutter, and disengaging the detent and the pawl from their respective ratchets, means for preventing the detent and the pawl from re-engaging the ratchets until a fresh portion of film is wound across the measuring roll, and manual means for disengaging the pawl to permit the uninterrupted winding of the backing paper.

4. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll, a single-tooth ratchet connected with the measuring roll and adapted to make one revolution during the passage of a predetermined length of film over said roll, a detent adapted to engage the ratchet, a pawl pivoted on the detent, a multi-tooth ratchet engageable by the pawl to lock said winding mechanism, means for releasing the shutter, and simultaneously disengaging the detent and the pawl from their respective ratchets, and means for preventing re-engagement of said detent and pawl until a predetermined length of film has been moved over said roll.

5. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll and a pivotally and slidably mounted detent therefor, means for preventing movement of the film winding mechanism in one direction, a ratchet, a pawl pivotally mounted on the detent and adapted to engage the ratchet to prevent the film winding mechanism from operating, a single-tooth ratchet engageable by the detent, means for simultaneously releasing the shutter, and disengaging the pawl from the ratchets and the detent from the single-tooth ratchet to free said winding mechanism and said measuring roll, and means for preventing the re-engagement of the detent and the pawl with their respective ratchets until a predetermined length of film has been passed over the film measuring roll.

6. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll, a single-tooth ratchet connected with the film winding mechanism and adapted to make one revolution during the movement of a fresh exposure area of film over said measuring roll, a slidable pivoted detent arranged to block the single-tooth ratchet at the end of one revolution, a slidable member arranged to move the detent out of engagement with the ratchet when the shutter is released, a pawl in the path of said slidable member, a multi-tooth ratchet connected with said film measuring roll and engageable by said pawl, and means for preventing both the detent and the pawl from engaging the ratchets until a fresh area of film has passed over the measuring roll.

7. In a camera for roll film including backing paper and having a shutter of the type requiring setting before making an exposure, the combination with a film winding mechanism, a shutter setting mechanism, a single manually operable member connected to both the film wind and shutter setting mechanisms, said film winding mechanism including a film measuring roll, a single-tooth ratchet connected with the film winding mechanism and adapted to make one revolution during the movement of a fresh exposure area of film over said measuring roll, a slidable pivoted detent arranged to block the single-tooth ratchet at the end of one revolution, a slidable member arranged to move the detent out of engagement with the ratchet when the shutter is released, a multi-tooth ratchet connected with the film winding mechanism, a pawl for said multi-tooth ratchet carried on said slidable member and adapted to block the film winding mechanism, and means for moving the detent to a position in which the single-tooth ratchet serves to block the detent from re-engaging said single-tooth ratchet until a predetermined length of film has been wound by said winding mechanism.

8. In a camera for roll film including backing paper and having a shutter of the type requiring setting before making an exposure, the combination with a film winding mechanism, a shutter setting mechanism, a shutter release member, a single manually operable member connected to both of said mechanisms, film measuring means including a single tooth ratchet, of a slidably mounted detent adapted to be engaged and moved by said single tooth ratchet when a predetermined length of film has been wound and to then lock said measuring means against further movement, a multi-tooth ratchet operatively connected to said winding mechanism, a pawl pivotally mounted on said detent and adapted to move into engagement with said multi-tooth ratchet to lock said winding mechanism against further movement when said detent is moved by said measuring means, and means on said shutter release member adapted to engage and move said pawl relative to said detent to release said winding mechanism and to then move said pawl and detent as a unit to release said measuring means.

HARLOW D. PHILIPS.